(12) United States Patent
Sonobe et al.

(10) Patent No.: US 6,376,033 B1
(45) Date of Patent: Apr. 23, 2002

(54) FIXING BELT FOR AN ELECTRICAL APPLIANCE AND METHOD OF MANUFACTURING THE SAME

(75) Inventors: Saburo Sonobe, Toride; Akio Onuki, Kanagawa-ken, both of (JP)

(73) Assignee: Kinyosha Co., Ltd., Tokyo (JP)

( * ) Notice: Subject to any disclaimer, the term of this patent is extended or adjusted under 35 U.S.C. 154(b) by 0 days.

(21) Appl. No.: 09/358,065

(22) Filed: Jul. 20, 1999

(30) Foreign Application Priority Data

Jul. 21, 1998 (JP) .......................................... 10-205135

(51) Int. Cl.$^7$ .............................. B32B 1/08; B32B 3/30; B32B 5/08; B32B 25/20; G03G 15/20

(52) U.S. Cl. ................... 428/34.7; 428/36.2; 428/36.8; 428/295.4; 428/296.1; 428/297.1; 428/421; 428/422; 428/447; 428/906; 428/167; 399/303; 399/307; 399/312; 399/313

(58) Field of Search ................. 428/34.5, 34.7, 428/36.1, 36.3, 36.8, 295.1, 295.4, 296.4, 297.1, 421, 422, 447, 906, 296.1, 36.2, 167; 156/169, 173; 399/303, 307, 312, 313

(56) References Cited

U.S. PATENT DOCUMENTS

| | | | | |
|---|---|---|---|---|
| 4,435,067 A | * | 3/1984 | Draai et al. ................. | 399/308 |
| 5,420,675 A | * | 5/1995 | Thompson et al. ......... | 399/237 |
| 5,585,414 A | * | 12/1996 | Klemarczyk et al. ........ | 522/13 |
| 6,134,395 A | * | 10/2000 | Sasaki et al. ................. | 399/46 |

* cited by examiner

Primary Examiner—Paul Thibodeau
Assistant Examiner—Ramsey Zacharia
(74) Attorney, Agent, or Firm—Volpe and Koenig, P.C.

(57) ABSTRACT

Disclosed is a transfer-fixing belt for an electronic appliance, comprising a seamless reinforcing layer made of a continuous string, a heat resistant rubber layer formed on the reinforcing layer, and a heat resistant resin layer formed on the heat resistant rubber layer and adapted for releasing the toner attached thereto.

16 Claims, 3 Drawing Sheets

FIXING BELT FOR AN ELECTRICAL APPLIANCE AND METHOD OF MANUFACTURING THE SAME

BACKGROUND OF THE INVENTION

The present invention relates to a transfer-fixing belt for an electronic appliance and a method of manufacturing the same, particularly, to a fixing belt for a fixing device used in a electrophotographic machine, particularly, a copying machine, a color printer or a facsimile, for melting a toner and fixing the molten toner to a paper sheet or the like and a method of manufacturing the same.

It was customary to use a transfer roll made of a sponge rubber having a semi-conductivity for transferring a toner from a photosensitive drum onto a paper sheet in an electronic appliance using an electrophotographic system such as a copying machine, a color printer or a facsimile. The transfer roll includes, for example, a semi-conductive sponge roll having a hardness of about 30° (Asker C type), which is prepared by mixing a conductive powder with an ethylene-propylene rubber to control the electrical resistance at $10^8$ to $10^9 \Omega \cdot cm$, as described in "Japan Hardcopy '91, p 27).

Figure 7:
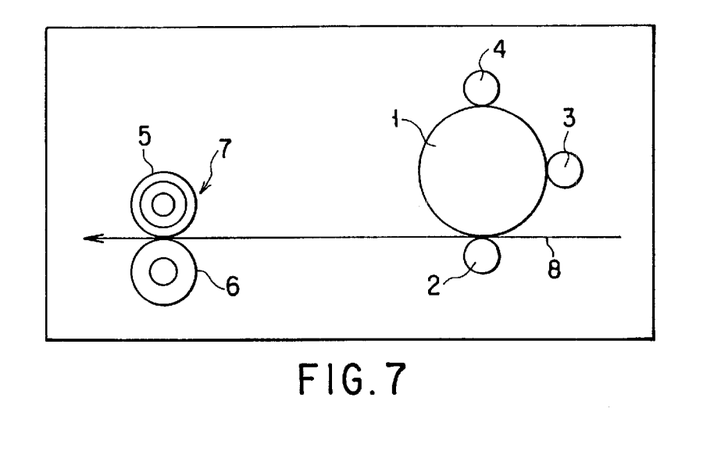
FIG. 7 shows a concept of a copying machine.

FIG. 7 shows the concept of a copying machine (or a color printer). As shown in the drawing, the copying machine includes a photosensitive drum 1. A transfer roll 2, a developing roll 3, and a charging roll 4 for charging the photosensitive drum 1 are arranged in the vicinity of the photosensitive drum 1. Also, a fixing device 7 consisting of a fixing roll 5 and a pressurizing roll 6 arranged to face the fixing roll 5 is arranged on the downstream side of the photosensitive drum 1. In the copying machine of the particular construction, a toner image is formed by the developing roll 3 on the photosensitive drum 1 and transferred by the transfer roll 2 onto a paper sheet 8. Then, the paper sheet 8 bearing the toner image is transferred through a clearance between the fixing roll 5 heated to about 200 to 250° C. and the pressurizing roll 6. As a result, the toner image is fixed to the paper sheet 8. At the same time, the toner image is smoothed by the pressure applied to the paper sheet 8 when the paper sheet 8 passes through the clearance between the rolls 5 and 6.

Figure 8:
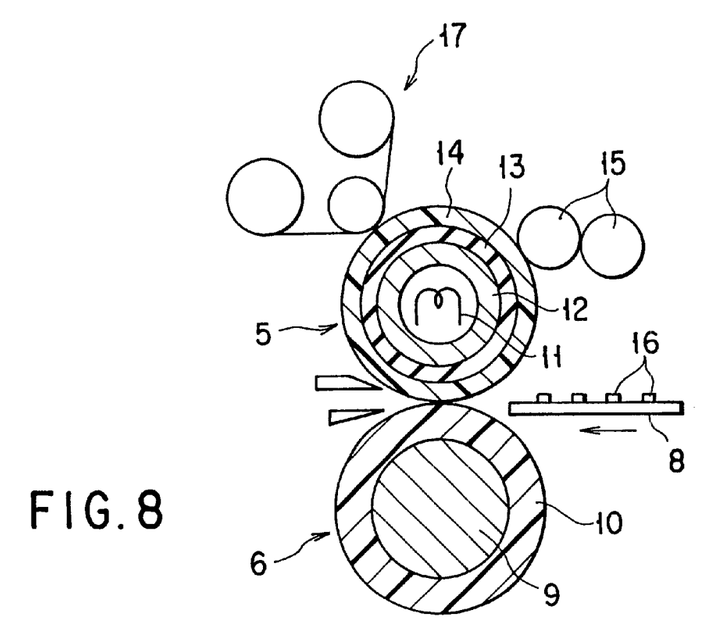
FIG. 8 shows a concept of a copying machine.

FIG. 8 shows in a magnified fashion the fixing portion, which is called a roll-nip system, shown in FIG. 7. As shown in FIG. 8, the pressurizing roll 6 comprises a mandrel 9 made of aluminum and a surface layer 10 covering the mandrel 9. The surface layer 10 consists of a heat-resistant resin adapted for releasing the toner such the heat resistant resin sold under the trademark TEFLON®. On the other hand, the fixing roll 5 comprises a mandrel 12 having a heater 11 housed therein, a lower layer 13 covering the mandrel 12 and formed of a heat-resistant soft silicone rubber (or silicone sponge), and a PFA tube (or FEP tube) 14 covering the lower layer 13 and serving to facilitate release of the toner.

An oil supply roll 15 for coating the fixing roll 5 with a silicone oil is arranged near the fixing roll 5. The silicone oil coating prevents a toner 16 from being attached to the fixing roll 5. Further, a cleaning device 17 for removing the residual toner and paper dust remaining on the fixing roll 5 is arranged near the fixing roll 5.

Several problems must be solved for increasing the copying speed in the roll-nip system described above. It should be noted that a predetermined contact time between the rolls is required for melting the toner and fixing the molten toner to the paper sheet. For ensuring a long contact time, it is conceivable to increase the thickness of the rubber layer or to employ a wide-nip system in which the diameter of the rubber roll is increased so as to increase the nip width (distance of the contact portion between the fixing roll 5 and the pressurizing roll 6). However, the apparatus is rendered bulky and the heat conduction is lowered by the increased rubber amount, making it substantially impossible to put these techniques to practical use. It is also proposed to use a softer solid silicone rubber so as to bring about bulge during the contact time and, thus, to increase the nip width. However, an appreciable effect cannot be obtained in this case.

Figure 9:
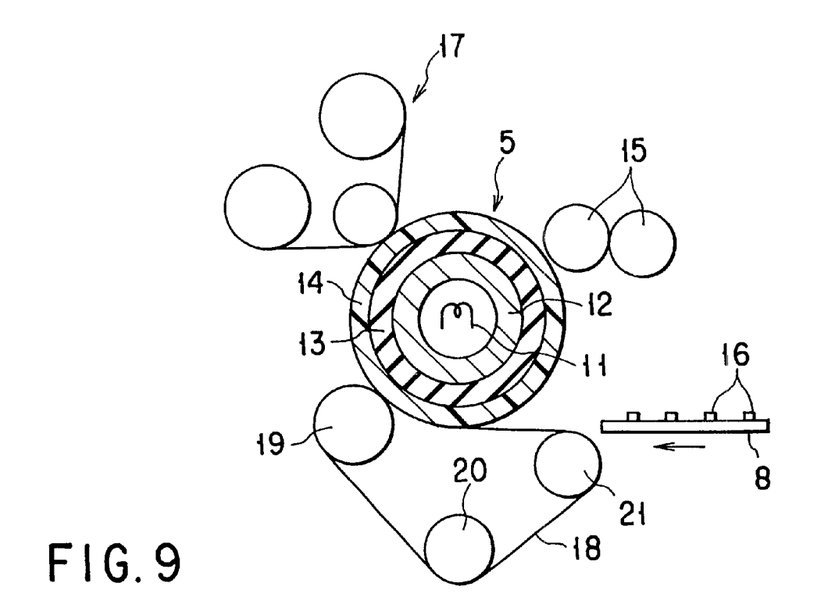
FIG. 9 shows a concept of a fixing device of a roll-nip system.

Under the circumstances, new proposals are being made for increasing the copying speed by employing a wide-nip technique. Specifically, known is a belt-nip system using the fixing roll 5 and a transfer-fixing belt 18 in combination as shown in FIG. 9. As shown in the drawing, the transfer-fixing belt 18 is stretched about a pressurizing roll 19 in contact with the fixing roll 5 via the belt 18, a supporting roll 20 and a driving roll 21.

Each of Japanese Patent Disclosure (Kokai) No. 61-132972 and Japanese Patent Disclosure No. 5-150679 discloses a wide-nip technique using a fixing device of a belt-nip system in place of the conventional roll-nip system for increasing the nip width with the fixing roll and, thus, increasing the copying speed.

JP '972 noted above proposes a method of forming a belt with a thin film for shortening the warm up time. In this prior art, a heat resistant polyimide resin film is used as a material of the fixing belt and a Teflon® resin or silicone rubber layer adapted for releasing the toner is laminated on the resin film to prepare an endless belt.

On the other hand, JP '679 discloses a fixing roll constructed as shown in FIG. 9. Specifically, it is taught that an aluminum mandrel having an outer diameter of 46 mm is covered with an intermediate HTV silicone rubber layer having a hardness of 45 Shore A and a thickness of 2 mm. Further, a silicone RTV rubber layer as a top coating layer having a thickness of 50 $\mu$m is formed by a dip coating method on the surface of the intermediate layer to form an elastic rubber layer having a mirror surface. The endless belt transferred between the fixing roll and the pressurizing roll is formed of a polyimide film having, for example, a thickness of 75 $\mu$m, a width of 300 mm and a circumferential length of 288 mm. Since the endless belt is formed of a hard polyimide film, it is considered reasonable to understand that the surface of the fixing roll is covered with the elastic rubber layer so as to impart elasticity to the fixing roll surface that is brought into contact with the toner.

Japanese Patent No. 2650864 proposes a fuser belt (fixing belt) of a three-layer structure as a seamless belt. It is taught that the belt comprises an inner resistance layer, an intermediate polyimide layer and an outer layer adapted for releasing the toner and made of a material having a low surface energy such as biton, Teflon® resin or silicone.

Further, Japanese Patent No. 2657990 proposes a fixing system in which a transfer material and a PET (polyethylene terephthalate) film having a thickness of 6 $\mu$m are bonded to a pressurizing roll. In this prior art, the pressurizing roll is covered with a silicone rubber elastic layer.

The PET film used as a transfer-fixing belt is seriously defective in that the film is greatly shrunk thermally. The melting and fixing of the toner are performed in a fixing device heated to 220 to 250° C. The thermal shrinkage of the PET film at 200° C. reaches 5% in the vertical direction. Since the transfer-fixing belt is used at temperatures around the melting point (230° C.) of PET, irregularities are generated over the entire surface of the transfer-fixing film, resulting in failure to perform a satisfactory fixation. On the other hand, polyimide, which is another main material of the transfer-fixing belt, is free from the defects described above. However, polyimide is highly costly.

The transfer-fixing belt consisting of a plastic film alone is generally low in tear strength, with the result that, where the edge portion of the belt is scratched or cracked, the cracking grows easily to cause the entire belt to be torn. Further, the transfer-fixing belt consisting of a plastic film alone is generally low in flexibility in the thickness direction, resulting in failure to be deformed along the toner image formed as a projecting portion on a copying material of a paper sheet or an OHP film (film, which is harder than a paper sheet, for an overhead projector). Therefore, when it comes to a picture image in which thick toner film portions and thin toner film portions are mixed at random, particularly a color picture image, a sufficiently high pressure is not applied to the thin toner film portions. It follows that a uniform fixation cannot be achieved.

Under the circumstances, it is very difficult nowadays to put a transfer-fixing belt made of a plastic film alone to a practical use.

BRIEF SUMMARY OF THE INVENTION

An object of the present invention is to provide a transfer-fixing belt for an electronic appliance, the belt achieving a wide-nip feature, having a high heat conductivity, capable of improving the copying speed, rich in flexibility and excellent in dimensional stability, and the belt comprising a seamless reinforcing layer made of a continuous string, a heat resistant rubber layer formed on the reinforcing layer, and a heat resistant resin layer formed on the heat resistant rubber layer and adapted for releasing the toner attached thereto.

The transfer-fixing belt may further comprise a rubber paste layer on which the reinforcing layer is formed. Also, a continuous string covered with a rubber paste may be used for forming the reinforcing layer.

Another object of the present invention is to provide a method of manufacturing a transfer-fixing belt for an electronic appliance, the belt being capable of improving the copying speed, rich in flexibility and excellent in dimensional stability, and the method comprising the steps of forming a seamless reinforcing layer on a mandrel, forming a heat resistant rubber layer on the reinforcing layer, forming a heat resistant resin layer adapted for releasing the toner attached thereto on the heat resistant rubber layer, and withdrawing a laminate structure consisting of the reinforcing layer, the heat resistant rubber layer and the heat resistant resin layer from the mandrel.

According to a second aspect of the present invention, there is provided a method of manufacturing a transfer-fixing belt for an electronic appliance, compromising the steps of:

forming a rubber paste layer on a mandrel;

forming a seamless reinforcing layer on the rubber paste layer by continuously supplying a string to the mandrel while rotating the mandrel to have the mandrel wound with the string starting with one end portion of the mandrel;

forming a heat resistant rubber layer on the reinforcing layer;

forming a heat resistant resin layer adapted for releasing the toner attached thereto on the heat resistant rubber layer; and withdrawing a laminate structure including the rubber paste layer, the reinforcing layer, the heat resistant rubber layer and the heat resistant resin layer from the mandrel.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A first aspect of the present invention is directed to a transfer-fixing belt for an electronic appliance, comprising a seamless reinforcing layer made of a continuous string, a heat resistant rubber layer formed on the reinforcing layer, and a heat resistant resin layer formed on the heat resistant rubber layer and adapted for releasing the toner attached thereto. The transfer-fixing belt may further comprises a rubber paste layer on which the reinforcing layer is formed. Also, a continuous string covered with a rubber paste may be used for forming the reinforcing layer.

On the other hand, a second aspect of the present invention is directed to a method of manufacturing a transfer-fixing belt for an electronic appliance, comprising the step of forming a rubber paste layer on a mandrel, the step of forming a seamless reinforcing layer on the rubber paste layer by continuously supplying a string to the mandrel while rotating the mandrel to have the mandrel wound with the string starting with one end portion of the mandrel, the step of forming a heat resistant rubber layer on the reinforcing layer, the step of forming a heat resistant resin layer adapted for releasing the toner attached thereto on the heat resistant rubber layer, and the step of withdrawing a laminate structure consisting of the rubber paste layer, the reinforcing layer, the heat resistant rubber layer and the heat resistant resin layer from the mandrel.

For preparing a transfer-fixing belt of the present invention, the outer surface of a mandrel is coated first with a rubber paste layer, followed by forming a seamless reinforcing layer made of a continuous string on the rubber paste layer.

Figure 5A:
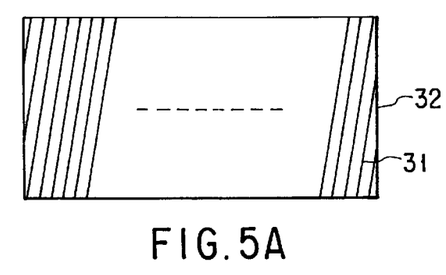
FIGS. 5A and 5B are side views each showing a reinforcing layer made of a string.
Figure 5B:
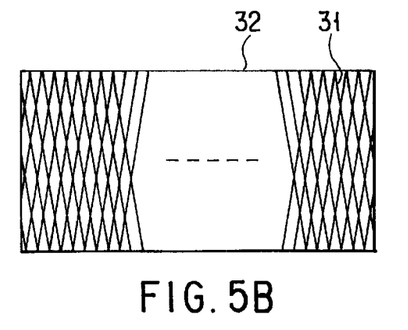

The seamless reinforcing layer included in the transfer-fixing belt of the present invention is of a single string-layer structure as shown in FIG. 5A or of a double string-layer structure as shown in FIG. 5B. The belt of the single string-layer structure as shown in FIG. 5A is prepared by winding a string 31 about a mandrel 32 from one end to the other end of the mandrel 32. Also, the belt of the double string-layer structure as shown in FIG. 5B is based on the belt of the single string-layer structure and is prepared by further winding the string 31 about the mandrel 32 wound with the first layer of the string 31 from the other end to the one end of the mandrel 32. For winding the string 31 about the mandrel 32, the string 31 is wound about a frustoconical bobbin made of a paper duct and the free end of the string 31 is fixed to one end of the mandrel 32. Under this condition, the mandrel 32 is rotated while moving the frustoconical bobbin along the mandrel 32. Incidentally, FIGS. 5A and 5B show for the sake of convenience that adjacent turns of the string 31 wound about the mandrel 32 are spaced from each other. However, it is desirable for the adjacent turns of the string 31 to be positioned very close to each other. The reinforcing layer of the particular construction is effective for preventing the transfer-fixing belt from bearing an elongation set.

The clearance between adjacent turns of the string 31 wound about the mandrel 32 is determined by the moving speed of the bobbin along the mandrel 32 under the condition that the mandrel 32 is rotated at a constant speed. If the moving speed is low, the clearance in question is diminished. By contraries, the clearance is increased with increase in the moving speed of the bobbin. Concerning the clearance between adjacent turns of the string 31, it is desirable for the adjacent turns to slightly contact each other. If the adjacent turns are unduly apart from each other, the string pattern appears on the surface, which is not desirable.

The material of the string for forming the reinforcing layer includes, for example, natural fibers such as hemp and cotton, synthetic fibers such as rayon, nylon, polyester, the synthetic fiber sold under the trademark VINYLON®, and polyamides, carbon fiber, glass fiber, TYRANNO® silicon carbide fiber and steel. Any type of string-like materials such as a monofilament and a twist yarn can be used for forming the reinforcing layer. Since the string is required to exhibit a high heat resistance, it is desirable to use particularly a heat resistant nylon, polyamide, aramid fiber, carbon fiber, music wire, etc.

Figure 3A:
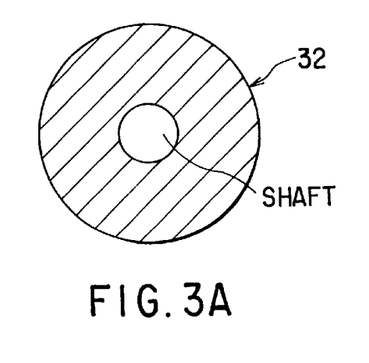
FIGS. 3A and 3B are cross sectional views each showing a mandrel used in the present invention.
Figure 3B:
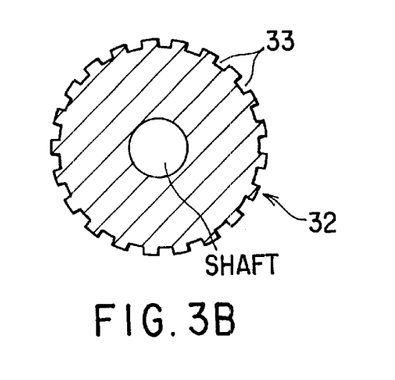

In the present invention, it is possible to use a mandrel 32 having a smooth circumferential surface as shown in FIG. 3A or a mandrel 32 provided with a plurality of axial grooves 33 formed on the circumferential surface as shown in FIG. 3B. Where the grooves 33 extending in the axial direction of the mandrel 32 are formed on the circumferential surface as shown in FIG. 3B, grooves are formed on the inner surface of the endless belt (transfer-fixing belt) prepared by using the mandrel 32. In the case of forming the grooves on the inner surface of the endless belt, the circumferential surface of the driving roll 21 used in the belt-nip system shown in FIG. 9 should be provided with teeth to permit the grooves of the endless belt to be engaged with the teeth of the driving roll 21. Naturally, the engagement permits transferring the endless belt without fail in accordance with rotation of the driving roll 21.

Figure 4:
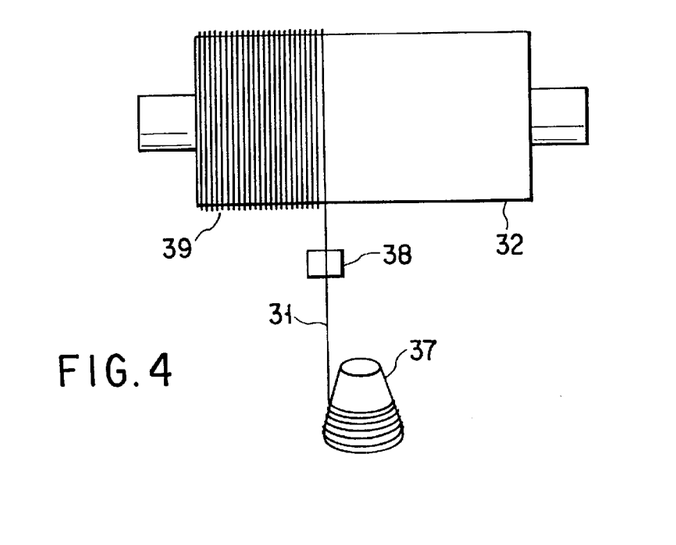
FIG. 4 shows how to form a reinforcing layer in the present invention.

The reinforcing layer is formed on the mandrel by the method shown in, for example, FIG. 4. Specifically, one end of the string 31 wound about a bobbin 37 is fixed to one end of the mandrel 32 having a predetermined outer diameter. The bobbin 37 is rotatably mounted to a moving device (not shown) for moving the bobbin 37 in the axial direction of the mandrel 32, which is rotated by a driving apparatus (not shown). If the mandrel 32 is rotated while moving the bobbin 37 along the mandrel 32 from one end toward the other end of the mandrel 32, the mandrel 32 is continuously wound with the string 31 to form a seamless reinforcing layer 39, which does not include a weft, on the circumferential surface of the mandrel 32. The reinforcing layer 39 thus formed is of a single string-layer structure. However, it is also possible to form a reinforcing layer of a plural string-layer structure. As shown in the drawing, the string 31 released from the bobbin 37 passes through a rubber paste container 38 housing a rubber paste before the string 31 is wound about the mandrel 32. It follows that the string 31 coated with the rubber paste is wound about the mandrel 32.

Figure 6:
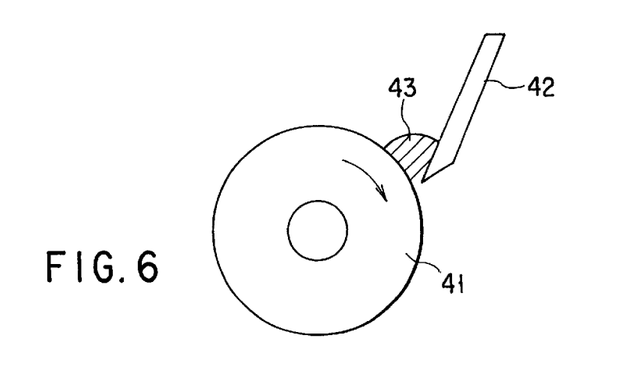
FIG. 6 shows how to coat a mandrel with a rubber paste in the method of the present invention.

In the present invention, a heat resistant elastic rubber layer is formed on the reinforcing layer. The rubber layer can be formed by the method shown in, for example, FIG. 6. In this method, a heat resistant elastic rubber layer, e.g., a heat resistant liquid silicone rubber layer, is formed on the reinforcing layer by a rotary coating technique. Specifically, a doctor blade 42 is arranged near a mandrel 41 having a reinforcing layer formed thereon. A heat resistant liquid silicone rubber 43 is supplied to the clearance between the mandrel 41 and the doctor blade 42 to cover the entire width of the mandrel 41. Then, the mandrel 41 is rotated as denoted by an arrow. As a result, the reinforcing layer formed on the surface of the mandrel 41 is coated with the liquid silicone rubber 43 to form a silicone rubber layer (heat resistant elastic rubber layer). The silicone rubber layer is formed under room temperature or under heating.

In the next step, a heat resistant resin layer adapted for releasing the toner attached thereto is formed to cover the heat resistant rubber layer. Specifically, a heat resistant resin, e.g., an aqueous or solvent-type fluororubber series paint or a fluorine-containing paint, is sprayed on the heat resistant rubber layer by using, for example, a spray gun to form a film, followed by baking the film at a high temperature so as to form the heat resistant resin layer. Finally, a laminate structure including the reinforcing layer, the heat resistant elastic rubber layer and the heat resistant resin layer adapted for releasing the toner attached thereto is withdrawn from the mandrel so as to obtain a desired endless belt (transfer-fixing belt).

A heat resistant solid rubber layer or a heat resistant sponge rubber layer can be used as the heat resistant elastic rubber layer in the present invention. The heat resistant rubber layer, which is flexible, can be deformed to conform with the thickness of the toner layer, making it possible to achieve a uniform fixation. The heat resistant rubber layer produces a prominent effect, particularly where a toner image is fixed to a plastic film that is not flexible such as an OHP film. In general, a solid silicone rubber that is soft is used for forming the heat resistant elastic rubber layer. It is also possible to use a sponge rubber having an increased softness. Specifically, a rubber material containing an organic or inorganic foaming agent is heated to gasify the foaming agent and, thus, to form a sponge rubber. Alternatively, the sponge rubber can be prepared by mixing in rubber micro-balloons consisting essentially of vinylidene chloride and containing isobutane as a swelling agent.

The heat resistant elastic rubber layer can be formed by coating of a liquid rubber, as described above. Alternatively, a kneaded rubber (solid rubber) can be used for forming the elastic rubber layer. In this case, the kneaded rubber is formed into a thin sheet and laminated on the reinforcing layer. It is also possible to extrude a kneaded rubber through an appropriate die of an extruder to form a hose-shaped extrudate. The reinforcing layer formed on the mandrel is covered with the hose-shaped extrudate to form the heat resistant elastic rubber layer. For fixing the toner, it is necessary to heat the transfer-fixing belt to 220 to 250° C. Unless the belt temperature is rapidly increased to the fixing temperature, the copying speed cannot be increased. In other words, a metal powder such as an alumina powder can be added to the rubber for increasing the heat conductivity of the belt and, thus, for shortening the warm-up time. In view of the heat resistance, the heat resistant elastic rubber layer should desirably be formed of silicone rubber, fluorosilicone rubber, fluororubber, ethylene-propylene rubber, hydrogenated nitrile rubber, etc.

In the present invention, the heat resistant elastic rubber layer is covered with a heat resistant resin layer, i.e., a layer having a low surface energy, adapted for releasing the toner attached thereto and for smoothing the surface of the toner layer fixed to the copying material. The particular resin layer can be formed by, for example, spraying with a spray gun GLS-213 (trade name of a diel latex prepared by dispersing a fluorine-containing resin in fluororubber and manufactured by Daikin-Kogyo K.K.) against the heat resistant elastic rubber layer with a primer layer interposed therebetween, followed by heating the sprayed latex at a high temperature. Alternatively, the particular resin layer can be formed by covering the heat resistant elastic rubber layer with a thermally shrinkable tube made of a fluorine-containing resin, e.g., PFA or FEP manufactured by Daikin-Kogyo K.K. Further, the resin layer can also be formed by a powder-coating of a powdery fluorine-containing resin, followed by baking the coated powder.

The present invention is advantageous in that:
1) A belt having a substantially desired thickness can be obtained;
2) The inner diameter of the belt can be controlled as desired by simply adjusting the outer diameter of the mandrel; and
3) A belt adapted for the copying on a copying material of A3 paper size or A4 paper size can be prepared easily by cutting a large belt as prepared in a predetermined width.

In general, an endless belt made of an unwoven fabric is prepared by sewing the fabric with a sewing machine. In this case, the sewn portion is thickened to form a stepped portion. Therefore, if the belt prepared by sewing is used as a fixing belt, an excessively high pressure is applied to the stepped portion, giving rise to a nonuniform fixation. Naturally, it is impossible to put the belt to a practical use. Also, a reinforcing cloth for the seamless endless belt includes those having an inlay knitting structure, which are prepared by circular knitting. However, since the knitting machine must be revised every time the inner diameter of the belt is changed, an enormous cost is required. Further, a seamless endless belt can be prepared by, for example, winding rubber or resin about a mandrel, followed by vulcanizing and curing the rubber or resin layer and subsequently withdrawing the cured rubber or resin layer from the mandrel. However, if the endless belt thus prepared is stretched about supporting rolls included in a fixing device, the belt bears a permanent set and is loosened because a reinforcing layer is not included in the belt, making it impossible to put the belt to a practical use.

On the other hand, the transfer-fixing belt of the present invention includes a reinforcing layer made of a continuous string and serving to prevent elongation of the belt. Therefore, the belt does not bear a permanent set even if the belt is stretched between supporting rolls during operation of the belt. If the reinforcing layer is made of a heat resistant string, the belt exhibits a strong resistance to the propagation of the tearing even if the belt is scratched. Thus, the belt is not cut away instantly unlike a plastic belt.

Where an aramid fiber is used for forming the reinforcing layer, the belt exhibits a tensile strength of 60 to 90 $kgf/mm^2$ and an elongation of 20 to 40%. Where a glass fiber is used for forming the reinforcing layer, the belt exhibits a tensile strength of 300 to 400 $kgf/mm^2$ and an elongation of 2 to 4%. On the other hand, the transfer-fixing belt is used under a tension of 2 to 3 kgf/cm.

The transfer-fixing belt of the present invention is an endless belt comprising a reinforcing layer made of a continuous string and a heat resistant elastic rubber layer. Since the endless belt is seamless, the fixing can be achieved uniformly. If a heat resistant solid or sponge rubber layer is used as the heat resistant elastic rubber layer, the belt can be deformed easily to conform with the irregularity in thickness of the toner layer formed on a paper sheet or an OHP film, making it possible to fix the toner image satisfactorily to the paper sheet or the OHP film regardless of the irregularity in thickness of the toner layer on the paper sheet or the OHP film.

The transfer-fixing belt of the present invention further comprises a heat resistant resin layer (surface layer) adapted for releasing the toner. A latex of a fluorine-containing resin or a tube of a fluorine-containing resin can be used for forming the heat resistant resin layer. Since the resin layer has a small friction coefficient and is excellent in its toner-releasing capability, the toner can be prevented from being attached to and remaining on the transfer-fixing belt.

In the present invention, the winding angle of the belt about the heating roll can be controlled by adjusting the positions of the pressurizing roll and the driving roll, making it possible to markedly increase the nip width. In other words, a wide-nip system can be provided so as to increase the fixing rate, i.e., the copying speed.

Some Examples of the present invention will now be described.

EXAMPLE 1

Figure 1:
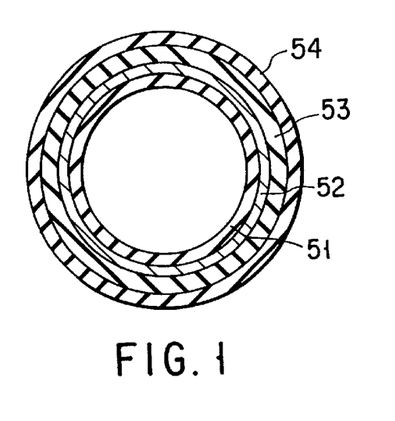
FIG. 1 is a cross sectional view showing a transfer-fixing belt for an electronic appliance prepared in Example 1 of the present invention.

Prepared was a transfer-fixing belt constructed as shown in FIG. 1.

In the first step, a silicone rubber layer 51 was formed in a thickness of 0.1 mm on a smooth outer surface plated with chromium of a mandrel (not shown) having a diameter of 100 mm and a width of 1000 mm. The silicone rubber layer was prepared by kneading a mixture consisting of DY32-541U (trade name of a silicone rubber manufactured by Toray-Dow Corning Silicone Inc.) and RC-4(50P)FD (trade name of a vulcanizing agent manufactured by Toray-Dow Corning Silicone Inc.). The overlapping joint portion was cut away with a knife to make the overlapping portion equal to the other portion in thickness.

Then, a rubber paste was prepared by sufficiently mixing SE6725A (trade name of a liquid silicone rubber manufactured by Toray-Dow Corning Silicone Inc.) and SE6725B (trade name of a curing agent manufactured by Toray-Dow Corning Silicone Inc.). The rubber paste thus prepared was put in a rubber paste container arranged as shown in FIG. 4. On the other hand, a string having a thickness of 0.2 mm and made of a carbon fiber treated with amino silane was wound about a bobbin. The string was partly released from the bobbin to run through the rubber paste container, and one end of the string was fixed to one end of the mandrel. Then, the mandrel was rotated and, at the same time, the bobbin was moved in parallel with and in the axial direction of the bobbin to wind the string continuously about the mandrel, thereby forming the reinforcing layer 52 on the silicone rubber layer 51. In forming the reinforcing layer 52, the bobbin was moved in the axial direction of the mandrel to set the distance between adjacent turns of the string at 0.05 mm.

In the next step, a doctor blade was mounted above the mandrel, and the liquid silicone rubber prepared in advance was loaded in the space defined between the mandrel and the doctor blade over the entire width of the doctor blade. Then, the doctor blade was gradually moved away from the mandrel while rotating the mandrel to form a silicone rubber layer in a thickness of 0.2 mm, followed by removing the doctor blade. Further, the silicone rubber was cured at room temperature for 5 hours while rotating the mandrel at a speed of 6 rpm, thereby forming a silicone rubber layer 53.

The surface of the silicone rubber layer 53 was polished with a sand paper of 400 meshes to remove the surface irregularity and, at the same time, to control the surface roughness, followed by coating the surface of the polished rubber layer with Primer GLP-1032R (trade name of resin manufactured by Daikin Kogyo K.K.). Then, the resin layer was coated with Diel Latex GLS·213 (trade name of fluororubber manufactured by Daikin Kogyo K.K.) with a spray gun in a thickness of 3 μm while rotating the mandrel. The coating was subjected to a heat treatment at 150° C. for 60 minutes to vulcanize and cure the fluororubber, thereby forming a fluororubber layer 54. At the same time, the underlying silicone rubber was vulcanized.

The laminate structure consisting of the silicone rubber layer 51, the reinforcing layer 52, the silicone rubber layer 53 and the fluororubber layer (heat resistant resin layer) 54 was removed from the mandrel to obtain a seamless and endless transfer-fixing belt.

The transfer-fixing belt of Example 1 comprises the silicone rubber layer 51, the reinforcing layer 52, the silicone rubber layer (heat resistant elastic rubber layer) 53, and the fluororubber layer (heat resistant resin layer) 54. Therefore, the transfer-fixing belt produces prominent effects, as summarized below:

(1) Since the reinforcing layer 52 made of a continuous string is interposed between the silicone rubber layers 51 and 53, the belt does not bear a permanent set even if the belt is stretched between supporting rolls during operation of the belt. Also, since the reinforcing layer 52 is made of a heat resistant string consisting of carbon fibers, the belt exhibits a high resistance to propagation of tearing even if the belt is scratched. As a result, the scratch grows very slowly and, thus, the belt is not cut away instantly unlike a plastic belt.

(2) Since the transfer-fixing belt is a seamless endless belt comprising the reinforcing layer 52 made of a continuous string and the heat resistant silicone rubber layers 51, 53, nonuniform fixing of the toner can be avoided unlike an endless belt prepared by sewing the end portions of a belt material by a sewing machine or the like. Also, the belt of Example 1 can be easily deformed to conform with the irregularity of the toner layer formed on a paper sheet or an OHP film, making it possible to fix the toner image satisfactorily to the paper sheet or the OHP film regardless of the irregularity in thickness of the toner layer on the paper sheet or the OHP film.

(3) Since the transfer-fixing belt comprises as the surface layer the fluororubber layer 54 having a small friction coefficient and excellent in its toner-releasing capability, the toner is prevented from being attached to and remaining on the transfer-fixing belt.

(4) The winding angle of the belt about the heating roll can be controlled by adjusting the position of the driving roll, making it possible to markedly increase the nip width. In other words, a wide-nip system can be provided so as to increase the fixing rate, i.e., the copying speed.

As a matter of fact, the fixing belt thus obtained was found to exhibit a hardness 40 as measured by a micro hardness tester and a static friction coefficient on the surface of 0.28 to 0.31. The fixing belt was cut out in a width of 1 cm to prepare a slender endless fixing belt. The slender belt was fixed at one point and a weight of 5 kg was hung from the belt to measure the elongation of the belt. The elongation was found to be 1.5% 24 hours later and 1.9% 500 hours later.

Further, the belt as withdrawn from the mandrel was cut in a width of 210 mm and the cut belt was used as a fixing belt of the belt-nip system shown in FIG. 9. In the case of the roll-nip system in the conventional monochromatic copying machine, the nip width was found to be 5 to 7 mm and the copying speed was found to be about 15 copies per minute. On the other hand, the nip width was found to be about 20 mm and the copying speed was found to be 45 copies per minute in the belt-nip system of the present invention. Clearly, the present invention is markedly superior to the prior art.

EXAMPLE 2

Figure 2:
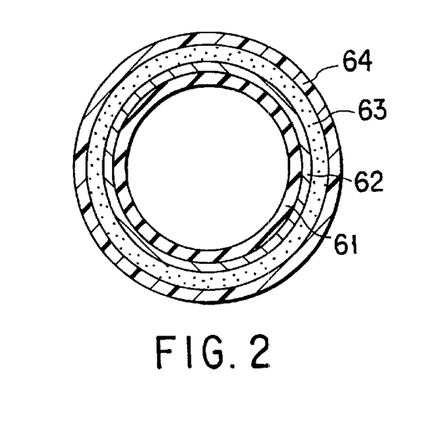
FIG. 2 is a cross sectional view showing a transfer-fixing belt for an electronic appliance prepared in Example 2 of the present invention.

Prepared was a transfer-fixing belt constructed as shown in FIG. 2.

In the first step, a silicone rubber layer 61 was formed in a thickness of 0.1 mm on a smooth outer surface plated with chromium of a mandrel (not shown) having a diameter of 100 mm and a width of 1000 mm. Specifically, a doctor blade was mounted above the mandrel. Then, a mixture consisting of SE6725A, which is the liquid silicone rubber used in Example 1, and SE6725B, which is a curing agent used in Example 1, was loaded in the space defined between the mandrel and the doctor blade over the entire width of the doctor blade. Then, the doctor blade was gradually moved away from the mandrel while rotating the mandrel to form the silicone rubber layer 61 in a thickness of 0.1 mm, followed by removing the doctor blade.

On the other hand, a string Cornex (trade name of an aramid fiber string having a thickness of 0.15 mm and manufactured by Teijin K.K.) was wound about a bobbin. The string was partly released from the bobbin, and one end of the string was fixed to one end of the mandrel coated with the silicone rubber layer 61. Then, the mandrel was rotated and, at the same time, the bobbin was moved in parallel with and in the axial direction of the bobbin to wind the string continuously about the mandrel, thereby forming a first layer made of the Cornex string on the silicone rubber layer 61. In forming the first Cornex string layer, the bobbin was moved in the axial direction of the mandrel to set the distance between adjacent turns of the string at 0.05 mm. Then, the bobbin was moved in the opposite direction while rotating the mandrel to form a second Cornex string layer so as to form a reinforcing layer 62 consisting of the first and second Cornex string layers.

In the next step, the reinforcing layer 62 was coated with a liquid silicone rubber having 7 parts by weight of azo bis-isobutyronitrile mixed therein as a foaming agent. The coating was heated at 160° C. for one hour to achieve crosslinking and foaming, thereby forming a silicone sponge layer 63 in a thickness of 1 mm. Further, the silicone sponge layer 63 was polished by using a grinder to set the diameter of the silicone sponge layer 63 at 102 mm.

In the next step, prepared was a tube of PFA (tetrafluoroethylene-perfluoroalkylvinyl ether copolymer) having an inner diameter of 102.05 mm and having the inner surface treated with sodium. Then, the silicone sponge layer 63 was uniformly coated with a one-pack liquid LTV silicone rubber acting both as an adhesive and as a lubricant, followed by fitting the PFA tube over the LTV silicone rubber layer. Then, a heat treatment was performed at 160° C. for one hour so as to cure the adhesive and, thus, to form a fluorine-containing resin layer 64 that was made integral with the silicone sponge layer 63. Finally, the laminate structure consisting of the silicone rubber layer 61, the reinforcing layer 62, the silicone sponge layer 63 and the fluorine-containing resin layer 64 was withdrawn from the mandrel so as to obtain a fixing belt having a thickness of about 1 mm and a diameter of 100 mm.

The transfer-fixing belt prepared in Example 2 comprises the silicone rubber layer 61, the reinforcing layer 62, the silicone sponge layer (heat resistant elastic rubber layer) 63, and the fluorine-containing resin layer (heat resistant resin layer) 64 and, thus, produces prominent effects similar to those produced by the transfer-fixing belt prepared in Example 1.

COMPARATIVE EXAMPLE

A polyester endless belt having a thickness of 75 μm, an inner diameter of 100 mm and a width of 210 mm was coated with Primer GLP-1032 (trade name of resin manufactured by Daikin Kogyo K.K.), followed by further coating the resultant resin layer with Diel Latex GLS·213 (trade name of a fluororubber manufactured by Daikin Kogyo K.K.) with a spray gun. These coating layers were subjected to a heat treatment at 150° C. for 60 minutes for the curing purpose.

The belt thus prepared was used as a transfer-fixing belt in the system shown in FIG. 9 for fixing the toner, with the fixing temperature set at 200° C. The belt was found to have been made irregular on the surface about 30 minutes later. As a result, the toner failed to be fixed uniformly, and it was impossible to continue to use the belt.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A fixing belt for an electronic appliance, comprising:
   an inner rubber layer;
   a seamless reinforcing layer formed on the inner rubber layer;
   a heat resistant elastic rubber layer formed on the seamless reinforcing layer; and
   a heat resistant resin layer formed on the heat resistant elastic rubber layer and adapted for releasing toner attached thereto,
   wherein the seamless reinforcing layer is of a single layer structure prepared by winding a continuous string about a mandrel from one end to the other end of the mandrel without using a weft.

2. A fixing belt for an electronic appliance according to claim 1 wherein the string is monofilament or multi-filament made of organic or inorganic fibers.

3. A fixing belt for an electronic appliance according to claim 2 wherein the organic fibers are selected from the group consisting of aramid fiber, polyamide fiber and polyimide fiber.

4. A fixing belt for an electronic appliance according to claim 2 wherein the inorganic fibers are selected from the group consisting of glass fiber, silicon carbide fiber and steel fiber.

5. A fixing belt for an electronic appliance according to claim 1, wherein said heat resistant elastic rubber layer is a silicone rubber layer obtained by a rotary coating of a heat resistant liquid silicone rubber.

6. A fixing belt for an electronic appliance according to claim 1, wherein said heat resistant elastic rubber layer is a silicone sponge layer.

7. A fixing belt for an electronic appliance according to claim 1, wherein said heat resistant resin layer consists of a fluorine-containing resin series latex or a fluorine-containing resin tube.

8. A fixing belt for an electronic appliance according to claim 1, wherein a plurality of grooves are formed in an inner surface of the inner rubber layer along a direction of a width of the inner rubber layer.

9. A fixing belt for an electronic appliance, comprising:
   an inner rubber layer;
   a seamless reinforcing layer formed on the inner rubber layer;
   a heat resistant elastic rubber layer formed on the seamless reinforcing layer; and
   a heat resistant resin layer formed on the heat resistant elastic rubber layer and adapted for releasing toner attached thereto,
   wherein the seamless reinforcing layer is of a double layer structure prepared by winding a continuous string about a mandrel from one end to the other end of the mandrel to form a first string layer, followed by further winding the continuous string about the first string layer from the other end to said one end of the mandrel to form a second string layer.

10. A fixing belt for an electronic appliance according to claim 9 wherein the string is monofilament or multi-filament made of organic or inorganic fibers.

11. A fixing belt for an electronic appliance according to claim 10 wherein the organic fibers are selected from the group consisting of aramid fiber, polyamide fiber and polyimide fiber.

12. A fixing belt for an electronic appliance according to claim 10 wherein the inorganic fibers are selected from the group consisting of glass fiber, silicon carbide fiber and steel fiber.

13. A fixing belt for an electronic appliance according to claim 9, wherein said heat resistant elastic rubber layer is a silicone rubber layer obtained by a rotary coating of a heat resistant liquid silicone rubber.

14. A fixing belt for an electronic appliance according to claim 9, wherein said heat resistant elastic rubber layer is a silicone sponge layer.

15. A fixing belt for an electronic appliance according to claim 9, wherein said heat resistant resin layer consists of a fluorine-containing resin series latex or a fluorine-containing resin tube.

16. A fixing belt for an electronic appliance according to claim 9, wherein a plurality of grooves are formed in an inner surface of the inner rubber layer along a direction of a width of the inner rubber layer.

* * * * *

UNITED STATES PATENT AND TRADEMARK OFFICE
CERTIFICATE OF CORRECTION

PATENT NO. : 6,376,033 B1
DATED : April 23, 2002
INVENTOR(S) : Sonobe et al.

It is certified that error appears in the above-identified patent and that said Letters Patent is hereby corrected as shown below:

Column 2,
Line 65, delete "220" and insert therefor -- 200 --.

Column 7,
Line 13, delete "220" and insert therefor -- 200 --.

Signed and Sealed this

Twenty-second Day of October, 2002

Attest:

Attesting Officer

JAMES E. ROGAN
Director of the United States Patent and Trademark Office